(12) United States Patent
Bailey

(10) Patent No.: US 11,437,802 B2
(45) Date of Patent: Sep. 6, 2022

(54) CABLE MANAGEMENT SYSTEM

(71) Applicant: Logan Bailey, Provo, UT (US)

(72) Inventor: Logan Bailey, Provo, UT (US)

( * ) Notice: Subject to any disclaimer, the term of this patent is extended or adjusted under 35 U.S.C. 154(b) by 454 days.

(21) Appl. No.: 16/675,034

(22) Filed: Nov. 5, 2019

(65) Prior Publication Data

US 2021/0135445 A1 May 6, 2021

(51) Int. Cl.
| | | |
|---|---|---|
| *H02G 11/02* | (2006.01) | |
| *B65H 75/40* | (2006.01) | |
| *H01R 13/72* | (2006.01) | |
| *H01R 13/62* | (2006.01) | |

(52) U.S. Cl.
CPC ............ *H02G 11/02* (2013.01); *B65H 75/40* (2013.01); *H01R 13/62* (2013.01); *H01R 13/72* (2013.01); *B65H 2701/533* (2013.01)

(58) Field of Classification Search
CPC ...... H02G 11/02; B65H 75/40; B65H 75/446; B65H 75/4465; B65H 75/4473
See application file for complete search history.

(56) References Cited

U.S. PATENT DOCUMENTS

| | | | | |
|---|---|---|---|---|
| 4,802,638 | A * | 2/1989 | Burger | H02G 11/02 242/601 |
| 6,554,218 | B2 * | 4/2003 | Buyce | H02G 11/02 242/396.5 |
| 7,032,854 | B2 * | 4/2006 | Marsden | B65H 75/4473 242/405.1 |
| 8,091,820 | B2 * | 1/2012 | Thorn | H02G 11/02 242/405 |
| 9,813,797 | B2 * | 11/2017 | Abfall | B65H 75/143 |
| 2003/0038209 | A1 * | 2/2003 | Remeczky | H02G 11/02 242/129 |
| 2004/0234070 | A1 * | 11/2004 | Gemme | H04Q 1/021 242/407 |
| 2010/0224714 | A1 * | 9/2010 | Winther | B65H 75/446 242/406 |

* cited by examiner

*Primary Examiner* — Sang K Kim
(74) *Attorney, Agent, or Firm* — Superior IP, PLLC; Dustin Call

(57) ABSTRACT

A cable management system. The cable management system includes a collapsible body. The cable management system also includes a mounting plate attached to the collapsible body, wherein the mounting plate is configured to attach to an external device. The cable management system further includes a faceplate attached to the collapsible body opposite the mounting plate.

16 Claims, 7 Drawing Sheets

CABLE MANAGEMENT SYSTEM

CROSS-REFERENCE TO RELATED APPLICATIONS

Not applicable.

BACKGROUND OF THE INVENTION

Various types of devices for organizing cables are known in the art. Usually items such as auxiliary cables, headphone cables, or extension cables can be organized on a track like device. However, these reels are not designed to attach to laptop adapters and chargers. Usually, laptop users are forced to wind the bulky cables directly around the adapter box, or hand wrapped with velcro ties. This method is tedious, untimely, and does not hold the cables in place very well.

Current devices are permanently attached to adapters but are large, and cumbersome while not in use, making it difficult to plug in and manage on your desk or table. Furthermore mobile laptop users are looking for speed, protection, portability, and cable length management when the distance to the wall outlets vary. There is a need for a cable management tool that can protect cables while winding, improve length control, and allow users to quickly store laptop cables.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes a cable management system. The cable management system includes a collapsible body. The cable management system also includes a mounting plate attached to the collapsible body, wherein the mounting plate is configured to attach to an external device. The cable management system further includes a faceplate attached to the collapsible body opposite the mounting plate.

Another example embodiment includes a cable management system. The cable management system includes a collapsible body and a mounting plate attached to the collapsible body, wherein the mounting plate is configured to attach to an external device. The cable management system also includes a faceplate attached to the collapsible body opposite the mounting plate, wherein the face plate is convex and covers at least a portion of the collapsible body. The cable management system further includes one or more apertures in the faceplate, wherein the one or more apertures allow a cable to pass through the faceplate.

Another example embodiment includes an electronic charging system. The electronic charging system includes a charging device. The electronic charging system also includes a cable management system attached to the charging device. The cable management system includes a collapsible body and a mounting plate attached to the collapsible body, wherein the mounting plate is configured to attach to the charging device. The cable management system also includes a faceplate attached to the collapsible body opposite the mounting plate, wherein the face plate is convex and covers at least a portion of the collapsible body. The cable management system further includes one or more apertures in the faceplate, wherein the one or more apertures allow a cable to pass through the faceplate. The cable management system additionally includes one or more slots, the one or more slots connecting each of the one or more apertures to the outside edge of the faceplate. The electronic charging system further includes a cable attached to the charging device, a portion of the cable wrapped around the collapsible body.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1A:
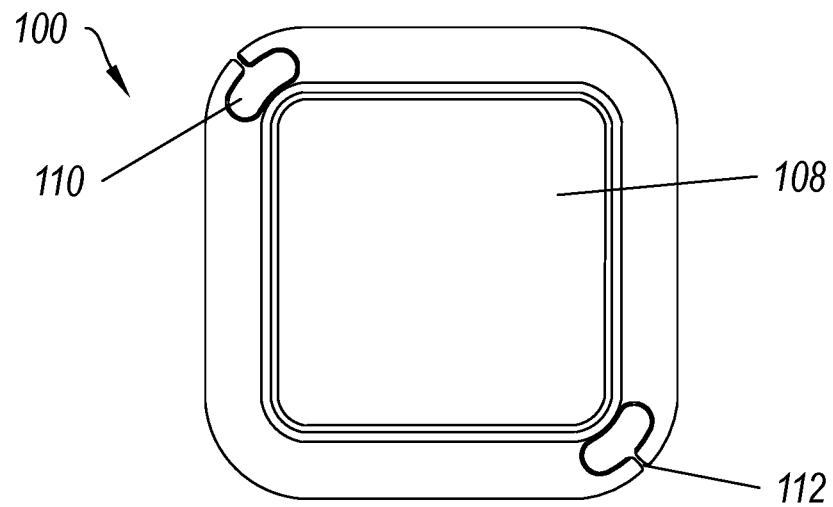
FIG. 1A illustrates a front view of the cable management system.
Figure 1B:
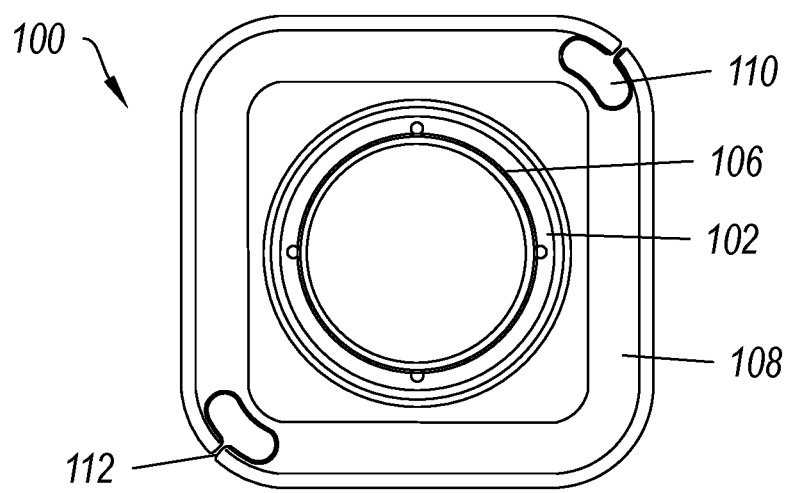
FIG. 1B illustrates a rear view of the cable management system.
Figure 1C:
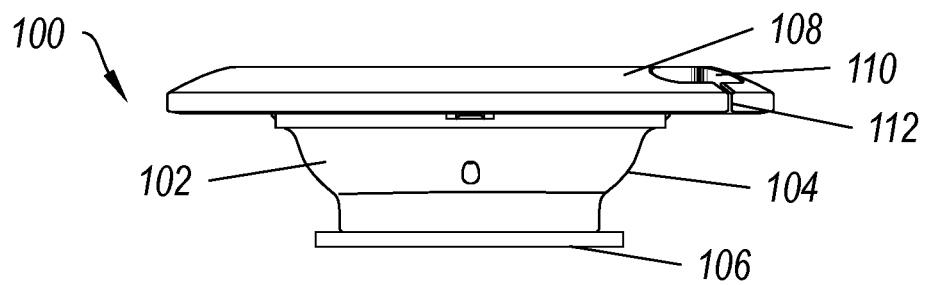
FIG. 1C illustrates a side view of the cable management system.
Figure 1D:
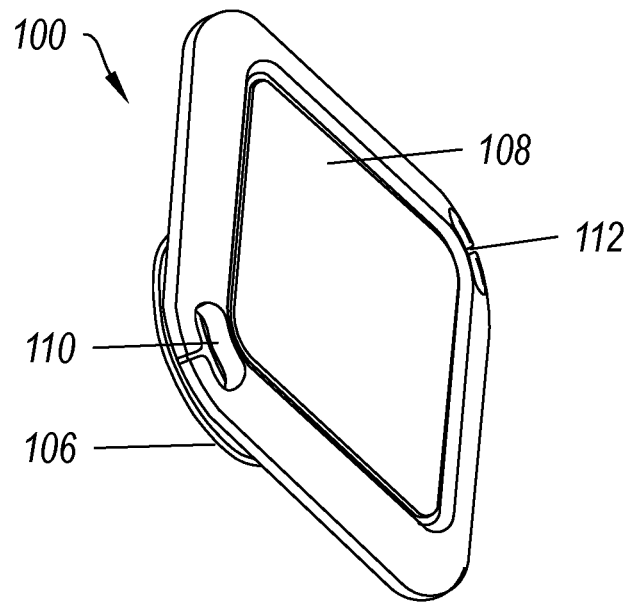
FIG. 1D illustrates a front side perspective view of the cable management system.
Figure 1E:
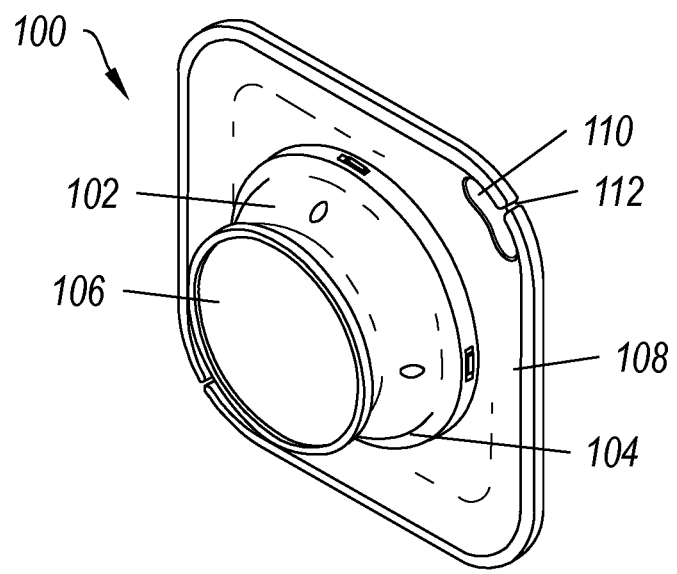
FIG. 1E illustrates a rear side perspective view of the cable management system.

FIGS. 1A-1D (collectively "FIG. 1") illustrate an example of a cable management system 100. FIG. 1A illustrates a front view of the cable management system 100; FIG. 1B illustrates a rear view of the cable management system 100; FIG. 1C illustrates a side view of the cable management system 100; FIG. 1D illustrates a front side perspective view of the cable management system 100; and FIG. 1E illustrates a rear side perspective view of the cable management system 100. The cable management system 100 is configured to attach to a device charger and hold the cable when the charger is not in use and allow the user to use the part or all of the cable length when the charger is in use. That is, the cable management system 100 allows a user to organize a cable for a laptop, cell phone, or any other desired electronic device.

FIG. 1 shows that that the cable management system 100 can include a collapsible body 102. The collapsible body 102 is expandable and contractable depending on the preference of the user. In the expanded state, a user may wrap a device cable around the collapsible body 102. In the contracted state, the collapsible body 102 has very little empty space and takes very little room. Therefore, the collapsible body 102 allows a user to determine the size of the collapsible body 102 to accommodate cables of different sizes.

FIG. 1 also shows that the collapsible body 102 has rotational symmetry. Rotational symmetry, also known as radial symmetry, is the property a shape has when it looks the same after some rotation around an axis by a partial turn. An object's degree of rotational symmetry is the number of distinct orientations in which it looks exactly the same for each rotation. For example, the collapsible body 102 can be approximately square shaped (4-fold symmetry) or cylindrical. Rotational symmetry allows the cable to be wrapped around the collapsible body 102. I.e., rotational symmetry allows a user to quickly make a circular motion with the cable to place the cable around the collapsible body 102.

FIG. 1 further shows that the collapsible body 102 can include one or more pleats 104. The pleats 104 allow the collapsible body 102 to collapse onto itself when the collapsible body 102 is contracted. I.e., in the fully contracted state, the bottoms of the pleats 104 are parallel to one another and in the fully expanded state the bottom of each pleat 104 is above the top of the pleat 104 immediately outside the pleat 104. The more pleats 104, the larger the collapsible body 102 can become when expanded and/or the more compact the collapsible body 102 can become when contracted. One of skill in the art will understand that other expansion means are contemplated herein. For example, the body could be telescoping or stretchable.

FIG. 1 additionally shows that the cable management 100 can include a mounting plate 106. The mounting plate 106 is configured to attach the collapsible body 102 to a charger or other area. For example, if the cable management system 100 is being used on a computer charger, the mounting plate 106 can attach the cable management system 100 to the computer charger and the charging cable can be wrapped around the collapsible body 102. As used in the specification and the claims, the phrase "configured to" denotes an actual state of configuration that fundamentally ties recited elements to the physical characteristics of the recited structure. That is, the phrase "configured to" denotes that the element is structurally capable of performing the cited element but need not necessarily be doing so at any given time. Thus, the phrase "configured to" reaches well beyond merely describing functional language or intended use since the phrase actively recites an actual state of configuration.

The mounting plate 106 can include an adhesive. The adhesive allows the mounting plate 106 to adhere during mounting. I.e., the adhesive "sticks" the mounting plate 106 to the charger or other area. The adhesive can include a glue or other adhesive or can include a reusable adhesive such as PU gel. For example, a PU gel pad can be peeled from a charger, rinsed, then reused on a different (or the same) surface (e.g., a wall).

The cable management system 100 can include a backing material. The backing material is releasably attached to the mounting plate 106 by the adhesive. In particular, the backing material can include paper or any other material suitable for protecting the adhesive on the mounting plate from drying or losing its adhesive properties before use. For example, the backing material can include a waxed paper which protects the adhesive from being removed or drying.

FIG. 1 also shows that the cable management system 100 can include a faceplate 108. The face plate 108 is attached to the collapsible body 102 and allows a user a place to grip to expand the collapsible body 102 and/or a place to push to contract the collapsible body 102. In addition, the collapsible body 102 can include a convex shape that covers at least a portion of the collapsible body 102. Thus, when the collapsible body 102 is in the fully contracted position, the collapsible body 102 is mostly or entirely covered. This prevents the collapsible body 102 from being accessed in the fully contracted position and provides aesthetic benefits.

FIG. 1 further shows that the faceplate 108 can include one or more apertures 110. The one or more apertures 110 allow the cable to pass through the faceplate 108. I.e., the one or more apertures 110 are configured to allow a cable to pass from one side of the faceplate 108 to the other side of the faceplate 108. Thus, the user can user a portion of the cable when desired. For example, the user could wind half of the cable around the collapsible body 102, pass the cable through an aperture 110 and then have half of the cable length still available. Thus, the user's mobility is somewhat preserved while the extra cable is stored.

FIG. 1 additionally shows that the faceplate 108 can include one or more slots 112. The one or more slots 112 connect the one or more apertures 110 to the outside edge of the faceplate 108. The slots 112 can allow the cable to pass into the aperture 110. I.e., the slot 112 can be large enough to allow a cable to pass through the slot 112 into the aperture 110 but not so large that the cable easily exits the slot 112 unless moved by a user. This allows a user to wind as much of the cable as desired around the collapsible body 102, then insert the cable into the aperture 110 through the slot 112.

The dimensions of the cable management system 100 can be critical to allow the cable management system 100 to perform its desired functions. For example, the faceplate 108 can be approximately square (i.e., square with rounded corners), with sides between 56 and 84 millimeters long. In particular, the faceplate 108 can have sides of approximately 70 millimeters. Likewise, the collapsible body 102 can be between 3 and 5 millimeters tall when contracted and 12 and 18 millimeters tall when fully expanded, creating enough space to wind the cable when fully expanded but minimizing space when fully contracted. In particular, the collapsible body 102 can be approximately 4 millimeters tall when fully contracted and 15 millimeters tall when fully expanded. As used in the specification and the claims, the term approximately shall mean that the value is within 10% of the stated value, unless otherwise specified.

Figure 2A:
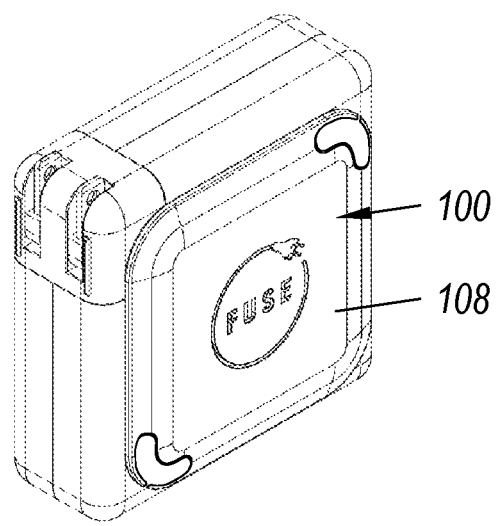
FIG. 2A illustrates a perspective view of an example of the cable management system with the collapsible body fully contracted.
Figure 2B:
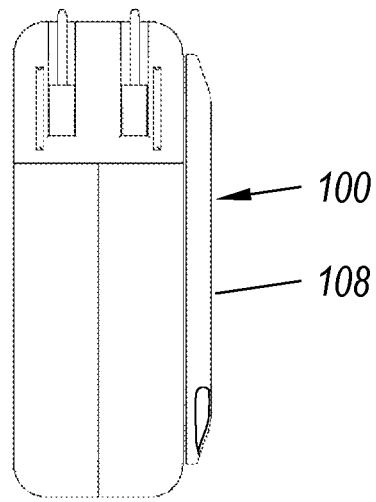
FIG. 2B illustrates a side view of an example of the cable management system with the collapsible body fully contracted.
Figure 2C:
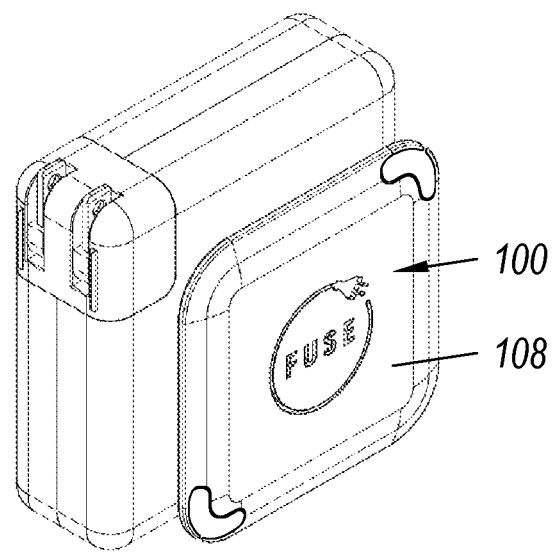
FIG. 2C illustrates a perspective view of an example of the cable management system with the collapsible body fully expanded.
Figure 2D:
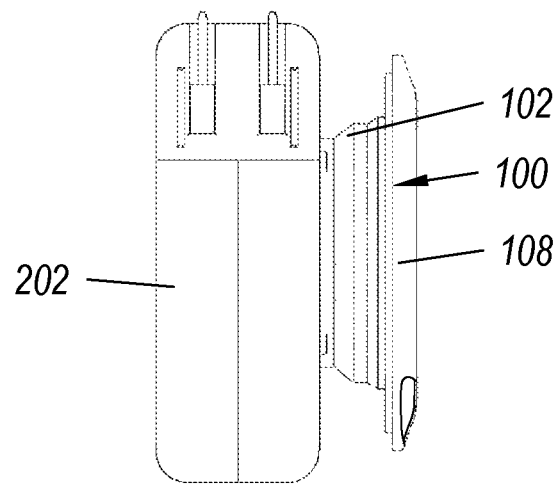
FIG. 2D illustrates a side view of an example of the cable management system with the collapsible body fully expanded.
Figure 2E:
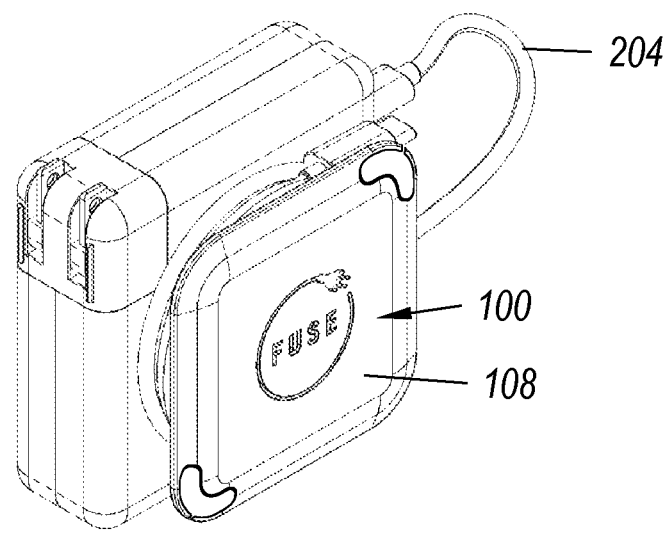
FIG. 2E illustrates a perspective view of an example of the cable management system with the collapsible body fully expanded and a cable wrapped around the collapsible body.
Figure 2F:
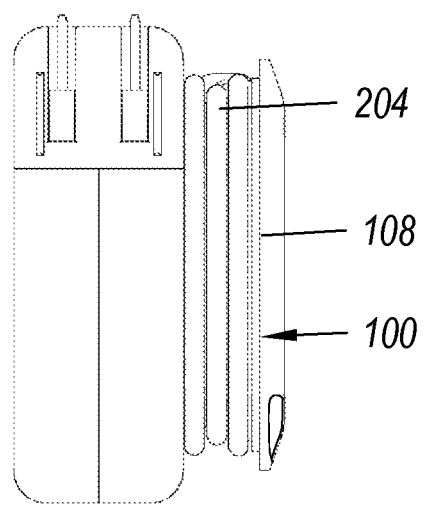
FIG. 2F illustrates a side view of an example of the cable management system with the collapsible body fully expanded and a cable wrapped around the collapsible body.

FIGS. 2A-2F (collectively "FIG. 2") illustrates an example of a cable management system 100 in use. FIG. 2A illustrates a perspective view of an example of the cable management system 100 with the collapsible body 102 fully contracted; FIG. 2B illustrates a side view of an example of the cable management system 100 with the collapsible body 102 fully contracted; FIG. 2C illustrates a perspective view of an example of the cable management system 100 with the collapsible body 102 fully expanded; FIG. 2D illustrates a side view of an example of the cable management system 100 with the collapsible body 102 fully expanded; FIG. 2E illustrates a perspective view of an example of the cable management system 100 with the collapsible body 102 fully expanded and a cable wrapped around the collapsible body; FIG. 2F illustrates a side view of an example of the cable management system 100 with the collapsible body 102 fully expanded and a cable 204 wrapped around the collapsible body. In particular, the cable management system 100 is shown attached to a device charger 202. Although the example shown is the cable management system 100 attached to a MacBook charger, one of skill in the art will appreciate that the cable management system 100 can be used with other chargers 202. In particular, any charger 202 that includes a large enough surface to allow the cable management system 100 to be attached can be used with the cable management system 100.

FIG. 2 shows that when the collapsible body 102 is fully contracted, the faceplate 108 is within between 8 and 12 millimeters of the charger 202. In particular, the faceplate 108 can be approximately 10 millimeters from the charger 202. This can be critical to ensure that the combination of the faceplate 108 is as slim as possible. I.e., by minimizing the distance, between the faceplate 108 and the charger 202 in connection with the convex shape of the faceplate 108, as described above, ensures that the faceplate 108 does not snag or catch when the charger 202 is being placed in a bag or other location. This protects the faceplate 108, the charger 202 and the bag into which they are being placed from being damaged.

FIG. 2 also shows that when the collapsible body 102 is fully expanded, the edge of the faceplate 108 is between 16 and 24 millimeters from the charger. In particular, the edge of the faceplate 108 can be approximately 20 millimeters from the charger. This provides sufficient room for the cable 204 but does not cause the cable management system 108 to become unwieldy. When the collapsible body 102 is fully expanded the cable 204 is wrapped around the collapsible body 102 then is passed through the slot 112 into the aperture 110.

Figure 3:
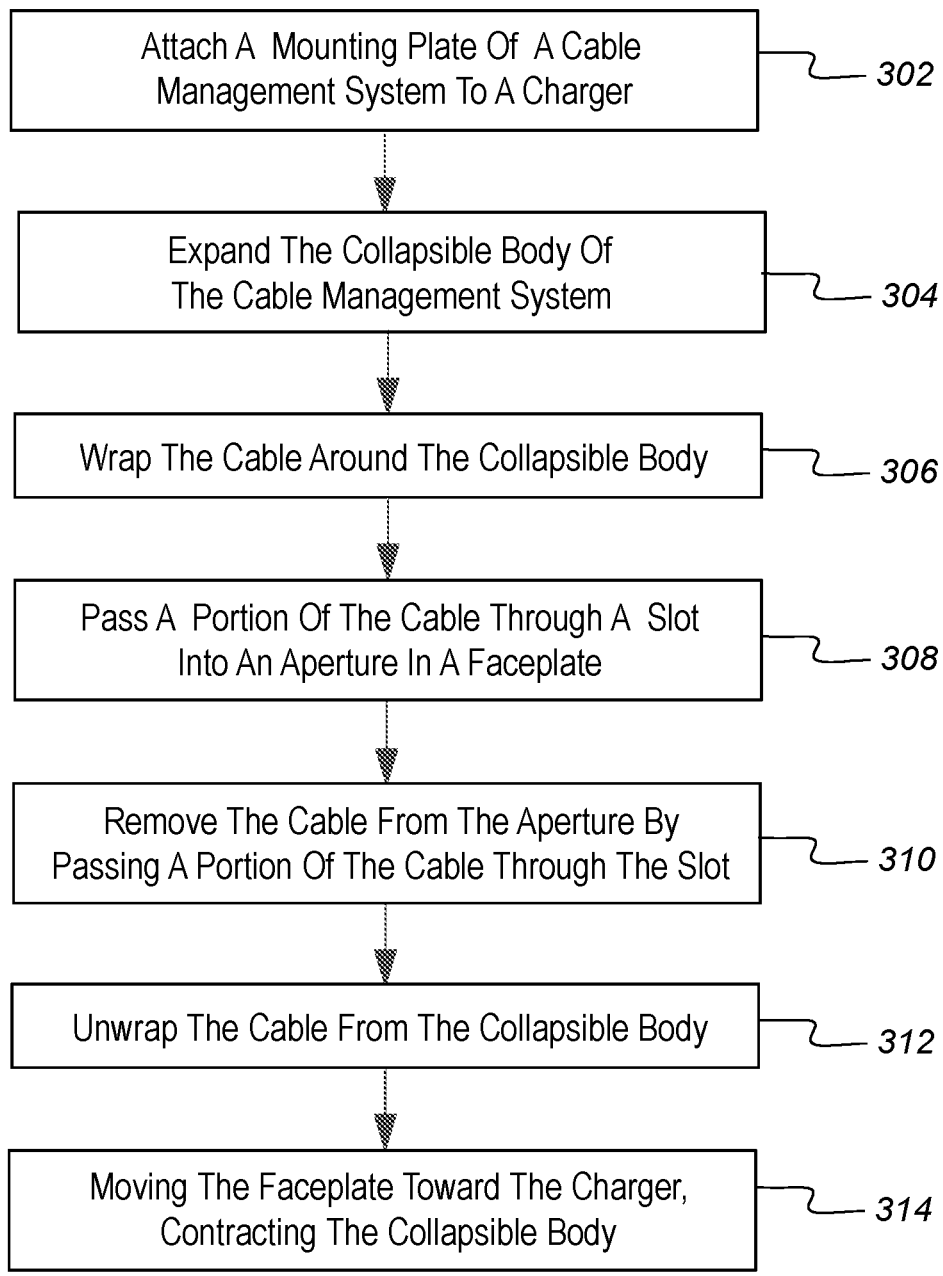
FIG. 3 is a flow chart illustrating a method 300 of managing a device cable using a cable management system.

FIG. 3 is a flow chart illustrating a method 300 of managing a device cable using a cable management system. In at least one implementation, cable management system can include the cable management system 100 of FIGS. 1-2. Therefore, the method 300 will be described, exemplarily, with reference to the cable management system 100 of FIGS. 1-2. Nevertheless, one of skill in the art can appreciate that the method 300 can be used with a cable management system other than the cable management system 100 of FIGS. 1-2.

FIG. 3 shows that the method 300 can include attaching 302 a mounting plate of a cable management system to a charger. The mounting plate is configured to attach the collapsible body to a charger or other area. For example, if the cable management system is being used on a computer charger, the mounting plate can attach the cable management system to the computer charger and the charging cable can be wrapped around the collapsible body.

The mounting plate can include an adhesive. The adhesive allows the mounting plate to adhere during mounting. I.e., the adhesive "sticks" the mounting plate to the charger or other area. The adhesive can include a glue or other adhesive or can include a reusable adhesive such as PU gel. For example, a PU gel pad can be peeled from a charger, rinsed, then reused on a different (or the same) surface (e.g., a wall).

The cable management system can include a backing material. The backing material is releasably attached to the mounting plate by the adhesive. In particular, the backing material can include paper or any other material suitable for protecting the adhesive on the mounting plate from drying or losing its adhesive properties before use. For example, the backing material can include a waxed paper which protects the adhesive from being removed or drying.

FIG. 3 also shows that the method 300 can include expanding 304 the collapsible body of the cable management system. The collapsible body is expandable and contractable depending on the preference of the user. In the expanded state, a user may wrap a device cable around the collapsible body. In the contracted state, the collapsible body has very little empty space and takes very little room. Therefore, the collapsible body allows a user to determine the size of the collapsible body to accommodate cables of different sizes.

The collapsible body has rotational symmetry. Rotational symmetry, also known as radial symmetry, is the property a shape has when it looks the same after some rotation around an axis by a partial turn. An object's degree of rotational symmetry is the number of distinct orientations in which it looks exactly the same for each rotation. For example, the collapsible body can be approximately square shaped (4-fold symmetry) or cylindrical. Rotational symmetry allows the cable to be wrapped around the collapsible body. I.e., rotational symmetry allows a user to quickly make a circular motion with the cable to place the cable around the collapsible body.

The collapsible body can include one or more pleats. The pleats allow the collapsible body to collapse onto itself when the collapsible body is contracted. I.e., in the fully contracted state, the bottoms of the pleats are parallel to one another and in the fully expanded state the bottom of each pleat is above the top of the pleat immediately outside the pleat. The more pleats, the larger the collapsible body can become when expanded and/or the more compact the collapsible body can become when contracted. One of skill in the art will understand that other expansion means are contemplated herein. For example, the body could be telescoping or stretchable.

When the collapsible body is fully expanded, the edge of the faceplate is between 16 and 24 millimeters from the charger. In particular, the edge of the faceplate can be approximately 20 millimeters from the charger. This provides sufficient room for the cable 204 but does not cause the cable management system to become unwieldy. When the collapsible body is fully expanded the cable 204 is wrapped around the collapsible body then is passed through the slot into the aperture.

FIG. 3 further shows that the method 300 can include wrapping 306 the cable around the collapsible body. Wrapping 306 the cable around the collapsible body including winding the cable in a circular motion around the collapsible body. The cable is thus placed in a compact formation. That is, the length of the cable is converted into a spiral, which is far more compact.

FIG. 3 additionally shows that the method 300 can include passing 308 a portion of the cable through a slot into an aperture in a faceplate. The face plate is attached to the collapsible body and allows a user a place to grip to expand the collapsible body and/or a place to push to contract the collapsible body. In addition, the collapsible body can include a convex shape that covers at least a portion of the collapsible body. Thus, when the collapsible body is in the fully contracted position, the collapsible body is mostly or entirely covered. This prevents the collapsible body from being accessed in the fully contracted position and provides aesthetic benefits.

The dimensions of the cable management system can be critical to allow the cable management system to perform its desired functions. For example, the faceplate can be approximately square (i.e., square with rounded corners), with sides between 56 and 84 millimeters long. In particular, the faceplate can have sides of approximately 70 millimeters. Likewise, the collapsible body can be between 3 and 5 millimeters tall when contracted and 12 and 18 millimeters tall when fully expanded, creating enough space to wind the cable when fully expanded but minimizing space when fully contracted. In particular, the collapsible body can be approximately 4 millimeters tall when fully contracted and 15 millimeters tall when fully expanded. As used in the specification and the claims, the term approximately shall mean that the value is within 10% of the stated value, unless otherwise specified.

The one or more apertures allow the cable to pass through the faceplate. I.e., the one or more apertures are configured to allow a cable to pass from one side of the faceplate to the other side of the faceplate. Thus, the user can user a portion of the cable when desired. For example, the user could wind half of the cable around the collapsible body, pass the cable through an aperture and then have half of the cable length still available. Thus, the user's mobility is somewhat preserved while the extra cable is stored.

The one or more slots connect the one or more apertures to the outside edge of the faceplate. The slots can allow the cable to pass into the aperture. I.e., the slot can be large enough to allow a cable to pass through the slot into the aperture but not so large that the cable easily exits the slot unless moved by a user. This allows a user to wind as much of the cable as desired around the collapsible body, then insert the cable into the aperture through the slot.

FIG. 3 moreover shows that the method 300 can include removing 310 the cable from the aperture by passing a portion of the cable through the slot. Removing 310 the cable from the aperture by passing a portion of the cable through the slot is the opposite of the above step. That is, when the user wants to use the cable, the user pulls the cable such that it passes through the slot and is no longer in the aperture.

FIG. 3 also shows that the method 300 can include unwrapping 312 the cable from the collapsible body. Unwrapping 312 the cable from the collapsible body is the reverse of the above step. That is, when the user wishes to use the cable, the user makes a circular motion in the opposite direction of the motion used to wrap the cable. One of skill in the art will appreciate that not all of the cable need be unwrapped 312. I.e., if the user wishes to, he she may unwrap 312 a portion of the cable while leaving the remaining cable wrapped.

FIG. 3 further shows that the method 300 can include moving 314 the faceplate toward the charger, contracting the collapsible body. When the collapsible body is fully contracted, the faceplate is within between 8 and 12 millimeters of the charger 202. In particular, the faceplate can be approximately 10 millimeters from the charger 202. This can be critical to ensure that the combination of the faceplate is as slim as possible. I.e., by minimizing the distance, between the faceplate and the charger 202 in connection with the convex shape of the faceplate, as described above, ensures that the faceplate does not snag or catch when the charger 202 is being placed in a bag or other location. This protects the faceplate, the charger 202 and the bag into which they are being placed from being damaged.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An electronic charging system, the electronic charging system comprising:
   a charging device;
   a cable management system attached to the charging device, the cable management system including:
      a collapsible body;
      a mounting plate attached to the collapsible body, wherein the mounting plate is configured to attach to the charging device;
      a faceplate attached to the collapsible body opposite the mounting plate, wherein the face plate is convex and covers at least a portion of the collapsible body;
      one or more apertures in the faceplate, wherein the one or more apertures allow a cable to pass through the faceplate; and
      one or more slots, the one or more slots connecting each of the one or more apertures to the outside edge of the faceplate; and
   a cable attached to the charging device, a portion of the cable wrapped around the collapsible body.

2. The electronic charging system of claim 1, wherein the collapsible body has rotational symmetry.

3. The electronic charging system of claim 1, wherein the collapsible body is cylindrical.

4. The electronic charging system of claim 1, wherein the collapsible body is approximately rectangular.

5. The electronic charging system of claim 1, wherein the collapsible body includes one or more pleats.

6. The electronic charging system of claim 1, wherein the collapsible body is:
   between 3 and 5 millimeters tall when contracted; and
   between 12 and 18 millimeters tall when fully expanded.

7. The electronic charging system of claim 1, wherein the collapsible body is:
   approximately 4 millimeters tall when contracted; and
   approximately 15 millimeters tall when fully expanded.

8. The electronic charging system of claim 1, wherein the mounting plate includes an adhesive.

9. The electronic charging system of claim 1, wherein the mounting plate includes a backing material placed over the adhesive.

10. The electronic charging system of claim 1, wherein the faceplate is approximately square.

11. The electronic charging system of claim 1, wherein the sides of the faceplate are between 56 and 84 millimeters long.

12. The electronic charging system of claim 1, wherein the sides of the faceplate are approximately 70 millimeters long.

13. The electronic charging system of claim 1, wherein distance between the charging device and the edge of the faceplate is between 16 and 24 millimeters when fully expanded.

14. The electronic charging system of claim 1, wherein distance between the charging device and the edge of the faceplate is approximately 20 millimeters when fully expanded.

15. The electronic charging system of claim 1, wherein distance between the charging device and the edge of the faceplate is between 8 and 12 millimeters when fully contracted.

16. The electronic charging system of claim 1, wherein distance between the charging device and the edge of the faceplate is approximately 10 millimeters when fully contracted.

* * * * *